United States Patent Office 3,182,035
Patented May 4, 1965

3,182,035
VINYL CHLORIDE RESIN PLASTICIZED WITH AN EPOXIDIZED COPOLYMER OF BUTADIENE AND XYLENE
John A. Garman, Baltimore, Md., assignor to FMC Corporation, New York, N.Y., a corporation of Delaware
No Drawing. Filed Nov. 23, 1962, Ser. No. 239,773
10 Claims. (Cl. 260—30.4)

This invention relates to plasticized resin compositions, and more particularly, plasticized poly(vinyl chloride).

The most widely used primary plasticizer for poly(vinyl chloride) resins is dioctyl phthalate, which gives extremely good performance. However, because of its costs, in many cases, less expensive secondary plasticizers are used to extend the dioctyl phthalate. These secondary plasticizers, such as partially hydrogenated terphenyl and chlorinated paraffin waxes, in some cases are used in substantial amounts. However, secondary plasticizers have the disadvantage that they tend to bleed out of the resin.

Stabilizers, such as epoxidized soy bean oil and epoxidized octyl oleate, are also commonly used with poly(vinyl chloride) resins in addition to the primary and secondary plasticizers. These stabilizers are scavengers which pick up the hydrogen chloride evolved during formation and use of the resin, and which otherwise would autocatalyze decomposition of the resin. However, the reaction products resulting from such stabilizing action are, in many cases, incompatible with the resin and these products tend to bleed out of the resin.

It has been suggested that epoxidized polybutadiene, and more particularly, epoxidized copolymers of polybutadiene and styrene may be used as secondary plasticizers and stabilizers for poly(vinyl chloride) resins. However, these epoxy resins do not have sufficient compatibility with poly(vinyl chloride) resins to be used as primary plasticizers therefor.

It is an object of this invention to provide an epoxy resin which has sufficient compatibility with poly-vinyl chloride) to be used as a primary plasticizer and stabilizer.

This and other objects will become apparent from the following description of this invention.

We have now discovered certain epoxy resin plasticized poly(vinyl chloride) compositions in which the plasticizer has unusual compatibility which comprise a poly(vinyl chloride) resin in which at least about 50% of the polymer forming units are derived from vinyl chloride, and as plasticizer therefor, about 1–100 parts by weight, per 100 parts of poly(vinyl chloride) resin, of an epoxidized copolymer of butadiene and xylene containing about 10–50% by weight of xylene and at least about 7% by weight of epoxy oxygen.

The epoxidized copolymer plasticizers used in the compositions of this invention are extremely compatible with poly(vinyl chloride), apparently due to the aromatic nature as well as the oxirane level of the plasticizer. These plasticizers are much more permanent than conventional epoxy plasticizers such as epoxidized soy bean oil or epoxidized octyl oleate and are suitable as primary plasticizers, auxiliary plasticizers or as stabilizers.

The epoxidized butadiene-xylene copolymers used as plasticizers in the resin compositions of this invention are described and claimed in a copending application of D. K. George and L. T. Gunkel, Serial No. 117,512, filed June 16, 1961. These epoxy plasticizers are prepared by epoxidizing a polymeric condensation product of butadiene and xylene. The butadiene and xylene are condensed and copolymerized so that the resulting product has an average composition of at least two butadiene residues for each xylene residue, said butadiene residues reacting primarily on the alkyl side chain of the xylene to produce an essentially linear product. The methods for preparing this type of copolymer are well-known in the art. These condensation products contain residual reactive double bonds remaining after condensation of butadiene with itself and with the alkyl groups of xylene. When these residual unsaturated groups are epoxidized, oxirane oxygen functionality is introduced into the copolymer chains.

The epoxidized butadiene xylene copolymer plasticizers taught herein are believed to have a structure consisting of a central xylene residue having a multiplicity of condensed butadiene units attached thereto and polymerized onto some or all of the alkyl groups, and in which a portion of the residual unsaturated bonds in the butadiene units has been converted to epoxy groups. The butadiene residues present in the copolymers are believed to be coupled by 1,4-linkages, which provide residual unsaturated bonds in the body of the copolymer chains, and partially by 1,2-linkages, which provide residual external unsaturated bonds, in the form of vinyl groups, on the copolymer chains. Therefore, these epoxidized copolymers contain both internal and external epoxy groups, and usually some residual olefinic unsaturation, the amount of residual unsaturation varying inversely with the degree of epoxidation.

In preparing these condensation products, the ratio of butadiene and xylene may be varied within wide limits. It is preferred that at least 2 moles of butadiene be reacted per mole of xylene. In general, it has been found that the beneficial aspects of the present invention are marked when about 10–50% by weight of the copolymer is derived from xylene. When more than about 50% of the copolymer is derived from xylene, the product contains an excess of low molecular weight condensates and thus is not suitable as a plasticizer for poly(vinyl chloride). When less than about 10% of the copolymer is derived from xylene, the properties of the condensation product approach those of polybutadiene itself, at the expense of the many advantages of the instant invention. It is necessary that at least about 10% of the copolymer be derived from xylene in order to provide the unusual compatibility and permanence of the plasticized compositions of this invention. Preferably, about 25–45% of the copolymer should be derived from xylene for best results.

The condensation of butadiene and xylene is conveniently accomplished using a finely divided alkali metal catalyst, such as sodium, potassium, or lithium, or a mixture of alkali metals, or their alloys, at elevated temperatures. For reasons of economy, sodium is the preferred catalyst. Rapid conversion is obtained using a catalytic amount of finely divided sodium, in mass or solution polymerization, by known techniques for sodium catalyzed polymerization. For example, sodium may be dispersed in an inert hydrocarbon such as benzene or kerosene, in the presence or absence of a dispersing agent. If desired, the catalyst may be suspended in a polyalkyl aromatic compound such as xylene for ultimate incorporation into the polymeric structure. Useful methods of preparing catalysts for this reaction are well-known in the art.

The amount of polymerization catalyst employed may be varied, depending on the desired properties of the product, but it is normally in the range of 0.1 to 10 parts of catalyst per 100 parts of diene monomer. Excellent results are normally obtained in the range of 3–5 parts of catalyst per 100 parts of butadiene. The catalyst may be dispersed in an inert solvent for the reactants, such as benzene, aliphatic hydrocarbons such as petroleum ether, decalin and the like. In general, it is convenient to employ solvents boiling in the range of 50–150°

C., although the boiling range of the solvent is not critical. Normally, a solvent is used which can be distilled or otherwise stripped from the reaction mixture after polymerization. As previously stated, both polymerization in the absence of added solvent or diluent may also be carried out, whereby the catalyst is dispersed in the xylene, which is then incorporated into the product during the polymerization reaction.

The condensation reaction generally occurs at temperatures above about 75° C., the reaction temperature being selected to produce condensation products in the desired molecular weight range. The reaction is conveniently carried out under superatmospheric pressure in an autoclave, by introducing therein the butadiene and the catalyst and heating the reaction mixture to a temperature between about 75° and 200° C. for several hours, preferably, while agitating the mixture. After the polymerization reaction has proceeded to the desired point (conveniently measured, for example, by the viscosity of the reaction mixture, by the consumption of butadiene, or by removing and testing a sample of the product), the mixture is cooled or otherwise quenched, and catalyst, diluent and unreacted monomers, if any, are removed, all by standard procedures. The catalyst is conveniently removed by washing with water or acid, and volatile materials are readily distilled.

The resulting polymeric condensation product of butadiene and xylene is a liquid of moderate to high viscosity. It is primarily linear in structure and contains residual olefinic unsaturation, normally characterized by an iodine number in the range of about 250–400. The number average molecular weight of these condensation products is generally in the range of about 250–1000, corresponding to a viscosity range of about 0.5–1000 poises at 25° C. and extrapolated to zero shear.

For the epoxidation of these copolymers, standard epoxidation techniques may be used. Aliphatic, aromatic and inorganic peracids, salts of peracids, peroxides and hydroperoxides are the most common of the effective epoxidizing agents. For convenience, the lower aliphatic peracids such as performic, peracetic, perpropionic and perbutyric are preferred reagents. With these reagents, the epoxidation reaction may be carried out using a preformed peracid mixture, or the peracid may be formed in the reaction medium, generally by adding hydrogen peroxide to an aliphatic acid or anhydride medium. Peracids may be prepared in any known way, such as is described in Organic Synthesis, Reinhold Publishing Corp. (1957), page 302. A number of epoxidation techniques for such polymers are illustrated in Patent No. 2,826,556 to F. P. Greenspan and A. E. Pepe.

Preferably, the epoxidation is carried out by the in situ formation of peracetic acid, whereby the polybutadiene is reacted with acetic acid and hydrogen peroxide in the presence of an ion exchange resin and a solvent. The solvent may be any low boiling solvent for the product, such as chloroform, benzene, toluene, and the like. When the reaction is completed, the epoxidation product is allowed to separate into an aqueous phase and a solvent phase. The solvent is then removed from the resin product by vacuum stripping. This method of epoxidation is described by F. P. Greenspan and R. J. Gall in Patent No. 2,919,283. The epoxidation may be conducted using stoichiometric amounts of peracids; that is, one mole of peracid per double bond in the polymer or an amount below that theoretically required may be used. There is no significant advantage in using excess oxidant.

The poly(vinyl chloride) used as the base resin for the compositions of this invention may be a homopolymer of vinyl chloride or a copolymer of vinyl chloride with other monomeric materials such as vinyl bromide, vinyl acetate, or vinylidene chloride, as well as others. These copolymers have compatibility characteristics so similar to those of the homopolymer of vinyl chloride that epoxidized butadiene-xylene copolymers are completely compatible therewith, provided at least about 50% of the polymer forming units are derived from vinyl chloride. When more than about 50% of the resin is derived from a comonomer such as vinylidene chloride, it assumes a different sort of compatibility and is not suitable with the plasticizers of this invention.

The epoxidized butadiene-xylene copolymers described herein may be used in varying amounts as plasticizers for poly(vinyl chloride) resins. They may be used as the sole primary plasticizer or as an auxiliary plasticizer or stabilizer in combination with other primary plasticizers. The amount of epoxidized butadiene-xylene copolymer will vary from about 1 to about 100 parts per 100 parts of poly(vinyl chloride) resin. When the epoxidized butadiene-xylene copolymer is used as the sole primary plasticizer, it will be present in amounts varying from about 40–100 parts per 100 parts of poly(vinyl chloride). When the epoxidized butadiene-xylene copolymer is used in combination with other plasticizers, the resin composition will contain 40–100 parts by weight of a conventional plasticizer and 1–40 parts by weight of epoxidized butadiene-xylene copolymer per 100 parts of poly(vinyl chloride). Conventional heat and light stabilizers such as metal salts are commonly added to the plasticized poly(vinyl chloride) compositions of this invention.

The epoxidized butadiene-xylene copolymers taught herein are also suitable for preparing curable poly(vinyl chloride) plastisols in which the epoxidized butadiene-xylene copolymer is used in combination with a curing agent therefor. In this system, the poly(vinyl chloride) resin is dispersed in the epoxidized butadiene-xylene copolymer, thus improving the processability and workability of the resin during preparation, and then heat-cured in the presence of a curative for the copolymer to produce a stiff, unplasticized product. In general, these resin compositions contain 0–40 parts by weight of a conventional primary plasticizer, 10–80 parts by weight of an epoxidized butadiene-xylene copolymer and 1–25 parts by weight of a polyfunctional active hydrogen curing agent for the epoxidized copolymer per 100 parts by weight of poly(vinyl chloride) resin.

Any of the polyfunctional active hydrogen curing agents, or combination of them, conventionally used for the curing of epoxidized polybutadiene copolymers may be used in the preparation of the poly(vinyl chloride) plastisols of this invention. Suitable examples of these curing agents include polycarboxylic anhydrides such as maleic, phthalic, hexahydrophthalic, tetra-hydrophthalic, succinic, itaconic, glutaric, dodecenyl succinic, chlorendic, trimellitic and pyromellitic anhydrides, anhydridepolyhydric alcohol mixtures containing a diol such as ethylene, diethylene, propylene and dipropylene glycols or a triol such as glycerol, dihydroxyphenols such as resorcinol, catechol and 2,2-bis(4-hydroxyphenyl)propane, aliphatic and aromatic amines such as triethylenetetramine and meta-phenylenediamine, and amine acids such as para-aminobenzoic acid, as well as many others.

The amount of curing agent which is added to the plastisol composition of this invention may be varied over a wide range depending upon the amount of epoxidized butadiene-xylene copolymer present, the particular curing agent used and the stiffness desired in the final product. In general, as already stated, about 1–25 parts of curing agent per hundred parts of poly(vinyl chloride) will be employed. When a high degree of stiffness is desired, about 0.5–2 equivalents of curing agent will be used per epoxide equivalent of epoxidized butadiene-xylene copolymer; one equivalent of curing agent being the amount which contains one functional group reactive with epoxy oxygen and one epoxide equivalent being the amount of epoxidized butadiene-xylene copolymer which contains one oxirane oxygen group. Of course, lesser amounts of curing agent may be used where some degree of plasticization is desired.

In the following examples, standard procedures were used to test the various poly(vinyl chloride) compositions. Modulus at 100% elongation, ultimate tensile strength and ultimate elongation were measured using ASTM method D412–61T with a type C dumbbell. Hardness was measured by ASTM method D1706–59T using a type A or D Shore durometer, as indicated. Weight loss by extraction with water, oil and gasoline was measured using the procedure described on page 64 of the Plasticizers catalogue (1958) of the Ohio-Apex Division of FMC Corporation. Weight loss in hexane and soapy water were measured by a similar test. Weight loss by carbon volatility was measured in accordance with ASTM method D1203–55 and heat stability was measured using ASTM test method D620–57T.

The following examples, illustrating the novel plasticized poly(vinyl chloride) compositions of this invention, are presented without any intention that the invention be limited thereto. All parts and percentages are by weight.

*Example 1*

A mixture of 400 g. of meta-xylene, 300 ml. of benzene and 200 ml. of sodium dispersion, prepared by dispersing about 30% by weight of sodium in benzene, were charged under nitrogen to an autoclave, sealed and heated to 90° C. The gases were vented, and to the autoclave was charged a total of 1000 g. of butadiene under 15 p.s.i.g. The temperature was maintained at about 90° C., and the pressure at 10–15 p.s.i.g., during addition of the butadiene. After all the butadiene had been added the reaction was continued for 30 min., and the reaction mixture was cooled to room temperature and quenched into excess water. The aqueous phase was discarded, and the oil phase was neutralized, washed, and stripped of solvent. The residue was a fluid copolymer oil having a viscosity at 25° C. of about 70 cps. and an iodine number of 313. The copolymer yield was about 1400 g. and the copolymer contained 30% meta-xylene.

Five hundred parts of the copolymer were dissolved in 1000 parts of benzene and epoxidized with 2400 parts of 16% peracetic acid containing 13 parts of sodium acetate. The epoxidation temperature was 70–75° C. After 2 hrs. of reaction, the reaction mixture was cooled, the organic phase was separated and washed with water until neutral. Solvent was removed by distillation under 5 ml. pressure, the distillation being stopped when the pot temperature had reached 90° C. The solvent free product analyzed 8.90% oxirane oxygen and had a viscosity at 25° C. of 75 poises.

A poly(vinyl chloride) resin composition was prepared as follows: One hundred parts of a high molecular weight poly(vinyl chloride) resin (Geon–101) was blended on a plastics mill with 1.5 parts of a Ba–Cd complex organic stabilizer (sold by Advance Solvents and Chemical Co. as Advastab BC–105) and 70 parts of the epoxidized copolymer prepared above. The blend was sheeted out and samples were tested for heat stability. Thin samples were sheeted out and tested for weight loss by extraction with water and with oil and weight loss by carbon volatility. Additional samples of the plasticized resin were compression molded for 5 min. at 170° C. and tested to determine modulus at 100% elongation, ultimate tensile strength, ultimate elongation and hardness.

For comparison, an additional poly(vinyl chloride) resin was prepared following the above procedure except that 54 parts of dioctyl phthalate was used as the plasticizer instead of the epoxidized copolymer. This amount of dioctyl phthalate gives an equivalent degree of plasticization. Samples of this resin were tested as before. The results of these tests are in the following table.

| Test | Epoxidized Copolymer | Dioctyl Phthalate |
|---|---|---|
| Modulus at 100% Elongation at 25° C. and 50% R.H., p.s.i. | 1,425 | 1,490 |
| Ultimate Tensile Strength at 25° C. and 50% R.H., p.s.i. | 2,509 | 2,660 |
| Ultimate Elongation at 25° C. and 50% R.H., percent | 293 | 320 |
| Hardness, Shore durometer A at 25° C. and 50% R.H. | 72 | 76 |
| Weight loss in Water, 10 days at 25° C., percent | 1.4 | 0.2 |
| Weight loss in Oil, 10 days at 25° C., percent | 1.0 | 11.6 |
| Weight loss in Gasoline, 10 days at 25° C., percent | 14.3 | 24.2 |
| Weight loss in Carbon Volatility, 24 hours at 70° C., percent | 4.3 | 1.7 |
| Heat Stability: | | |
| Pt–Co Color No. 50, min. | 15 | 25 |
| Pt–Co Color No. 500, min. | 85 | 40 |
| Black, min. | >210 | 60 |

*Example 2*

This example illustrates the addition of 80 parts of epoxidized copolymer per hundred parts resin. One hundred parts of poly(vinyl chloride) resin (Geon–101) was blended on a plastics mill with 1.5 parts of a Ba–Cd complex organic stabilizer and 80 parts of the epoxidized copolymer prepared in Example 1. Samples of the blend were sheeted out and tested as follows.

| | |
|---|---|
| Modulus at 100% Elongation at 25° C. and 50% R.H., p.s.i. | 1007 |
| Ultimate tensile strength at 25° C. and 50% R.H., p.s.i. | 2145 |
| Ultimate elongation at 25° C. and 50% R.H., percent | 334 |
| Hardness, Shore durometer A at 25° C. and 50% R.H. | 70 |
| Weight loss in water 10 days at 25° C., percent | 2.5 |
| Weight loss in oil 10 days at 25° C., percent | 1 |
| Weight loss in gasoline 10 days at 25° C., percent | 15.9 |
| Weight loss in carbon volatility 24 hours at 70° C., percent | 3.7 |
| Heat stability: | |
| Pt–Co Color No. 50, min. | 15 |
| Pt–Co Color No. 500, min. | 100 |
| Black, min. | >210 |

*Example 3*

This example illustrates the addition of 5 parts of epoxidized copolymer per hundred parts resin in a vinyl floor tile formulation. One hundred parts of poly(vinyl chloride) resin (Geon–101) was blended on a plastics mill with 45 parts of dioctyl phthalate, 5 parts of butyl stearate, 7.5 parts of trixylyl phosphate, 1.5 parts of a Ba–Cd complex organic stabilizer and 5 parts of the epoxidized copolymer prepared in Example 1. Samples of the blend were sheeted out and tested as follows.

| | |
|---|---|
| Modulus at 100% elongation at 25° C. and 50% R.H., p.s.i. | 954 |
| Ultimate tensile strength at 25° C. and 50% R.H., p.s.i. | 2268 |
| Ultimate elongation at 25° C. and 50% R.H., percent | 369 |
| Hardness, Shore durometer A at 25° C. and 50% R.H. | 72 |
| Weight loss in water 10 days at 25° C., percent | 0.6 |
| Weight loss in oil 10 days at 25° C., percent | 14.6 |
| Weight loss, carbon volatility 24 hours at 70° C., percent | 3.9 |
| Heat stability: | |
| Pt–Co Color No. 50, min. | 30 |
| Pt–Co. Color No. 500, min. | 50 |
| Black, min. | 100 |

*Example 4*

Six hundred parts by weight of the copolymer prepared in Example 1, dissolved in 1000 parts of benzene, were epoxidized at 70–75° C. using a mixture of 48 parts of 90% formic acid, 6 parts of phosphoric acid and 330 parts of 50% hydrogen peroxide. After 2 hrs. of reaction, the reaction mixture was cooled, the organic phase was separated and washed with water until neutral. Solvent was then removed by distillation under 5 ml. pressure, the distillation being stopped when the pot temperature had reached 90° C. The product analyzed 7.0% oxirane oxygen and had a viscosity at 25° C. of 10 poises.

One hundred parts of poly(vinyl chloride) resin (Geon-101) was blended on a plastics mill with 1.5 parts of a Ba–Cd complex organic stabilizer and 70 parts of the epoxidized copolymer prepared above. Samples of the blend were sheeted out and tested as follows.

| | |
|---|---|
| Modulus at 100% elongation at 25° C. and 50% R.H., p.s.i. | 1167 |
| Ultimate tensile strength at 25° C. and 50% R.H., p.s.i. | 1536 |
| Ultimate elongation at 25° C. and 50% R.H. percent | 190 |
| Hardness, Shore durometer A at 25° C. and 50% R.H. | 77 |
| Weight loss in water 10 days at 25° C., percent | 1.5 |
| Weight loss in oil 10 days at 25° C., percent | 6.0 |
| Weight loss, carbon volatility 24 hours at 70° C., percent | 4.1 |
| Heat stability: | |
| Pt–Co Color No. 50, min. | 35 |
| Pt–Co Color No. 500, min. | 90 |
| Black, min. | >210 |

*Example 5*

A portion of the butadiene-xylene copolymer prepared in Example 1 was stripped at 1 mm. pressure until a pot temperature of 120° C. was reached, thereby removing all of the 1:1 butadiene-xylene adduct.

Six hundred parts by weight of the copolymer which had been stripped free of 1:1 adduct was dissolved in 1200 parts benzene, and epoxidized with 2620 parts of 16% peracetic acid containing 19 parts of sodium acetate. The epoxidation temperature was 70–75° C. After 1 hr. of reaction, the organic phase was removed and washed until neutral with water. Solvent was removed by distillation under 5 ml. pressure until a pot temperature of 100° C. was obtained. The solvent-free epoxidized product analyzed 8.82% oxirane oxygen and had a viscosity at 25° C. of 64 poises.

One hundred parts of poly(vinyl chloride) resin (Geon-101) was blended on a plastics mill with 1.5 parts of a Ba–Cd complex organic stabilizer and 70 parts of the epoxidized copolymer prepared above. Samples of the blend were tested as follows.

| | |
|---|---|
| Modulus at 100% elongation at 25° C. and 50% R.H., p.s.i. | 1520 |
| Ultimate tensile strength at 25° C. and 50% R.H., p.s.i. | 2447 |
| Ultimate elongation at 25° C. and 50% R.H. percent | 337 |
| Hardness, Shore durometer A at 25° C. and 50% R.H. | 78 |
| Weight loss in water 10 days at 25° C., percent | 2.4 |
| Weight loss in oil 10 days at 25° C., percent | 1.9 |
| Weight loss in hexane 1 hour at 24° C., percent | 2.2 |
| Weight loss in soapy water 4 hours, agitated at 85° C., percent | 5.1 |
| Weight loss in gasoline 10 days at 25° C., percent | 18.2 |
| Weight loss, carbon volatility 24 hours at 70° C., percent | 2.9 |
| Heat stability: | |
| Pt–Co Color No. 50, min. | 10 |
| Pt–Co Color No. 500, min. | 150 |
| Black, min. | >210 |

*Example 6*

Another portion of the butadiene-xylene copolymer prepared in Example 1 was stripped at 1 mm. pressure until the pot temperature reached 165° C. thereby removing all of the 1:1 and 2:1 butadiene-xylene adduct.

Six hundred parts by weight of the copolymer which had been stripped free of 1:1 and 2:1 adduct was dissolved in 1200 parts benzene and epoxidized with 2620 parts of 16% peracetic acid containing 19 parts of sodium acetate. The epoxidation temperature was 70–75° C. After 1 hr. of reaction, the organic phase was removed and washed until neutral with water. Solvent was removed by distillation under 5 ml. pressure until a pot temperature of 100° C. was obtained. The solvent-free product analyzed 9.08% oxirane oxygen and had a viscosity at 25° C. of 132 poises.

One hundred parts of poly(vinyl chloride) resin (Geon-101) was blended on a plastics mill with 1.5 parts of a Ba–Cd complex organic stabilizer and 70 parts of the epoxidized copolymer prepared above. Samples of the blend were tested as follows.

| | |
|---|---|
| Modulus at 100% elongation at 25° C. and 50% R.H., p.s.i. | 1591 |
| Utimate tensile strength at 25° C. and 50% R.H., p.s.i. | 2437 |
| Ultimate elongation at 25° C. and 50% R.H., percent | 318 |
| Hardness, Shore durometer A at 25° C. and 50% R.H. | 78 |
| Weight loss in water 10 days at 25° C., percent | 1.7 |
| Weight loss in oil 10 days at 25° C., percent | 1.4 |
| Weight loss in hexane 1 hour at 24° C., percent | 2.0 |
| Weight loss in soapy water 4 hrs., agitated at 85° C., percent | 3.7 |
| Weight loss in gasoline 10 days at 25° C., percent | 15.8 |
| Weight loss, carbon volatility 24 hours at 70° C., percent | 2.0 |
| Heat stability: | |
| Pt–Co Color No. 50, min. | 15 |
| Pt–Co Color No. 500, min. | 45 |
| Black, min. | >210 |

*Example 7*

A mixture of 100 g. of meta-xylene, 300 ml. of benzene and 200 ml. of sodium dispersion, prepared by dispersing about 30% by weight of sodium in benzene, was charged under nitrogen to an autoclave, sealed and heated to 90° C. The gases were vented, and to the autoclave was charged a total of 900 g. of butadiene under 15 p.s.i.g. The temperature was maintained at about 90° C., and the pressure at 10 to 15 p.s.i.g., during addition of the butadiene. After all the butadiene had been added the reaction was continued for 30 min., and the reaction mixture was cooled to room temperature and quenched into excess water. The aqueous phase was discarded, and the oil phase was neutralized, washed, and stripped of solvent. The residue was a fluid copolymer oil having a viscosity at 25° C. of about 30 poises, and an iodine number of 375. The copolymer contained 10% meta-xylene.

Five hundred parts of the copolymer was dissolved in 1000 parts of benzene and epoxidized with 1800 parts of 15% peracetic acid containing 13 parts of sodium acetate. The epoxidation temperature was 70–75° C. After 2 hrs. of reaction, the organic phase was removed and worked up as in the previous examples. The solvent free product analyzed 8.09% oxirane oxygen and had a viscosity at 25° C. of 400 poises.

One hundred parts of poly(vinyl chloride) resin (Geon-101) was blended on a plastics mill with 1.5 parts of a Ba–Cd complex organic stabilizer and 70 parts of the epoxidized copolymer prepared above. Samples of the blend were tested as follows.

Modulus at 100% elongation at 25° C. and 50%
  R.H., p.s.i. ---------------------------------- 2012
Ultimate tensile strength at 25° C. and 50% R.H.,
  p.s.i. ---------------------------------------- 2262
Ultimate elongation at 25° C. and 50% R.H., per-
  cent ------------------------------------------ 212
Hardness, Shore durometer A at 25° C. and 50%
  R.H. ------------------------------------------ 94
Weight loss in water 10 days at 25° C., percent --- 0.5
Weight loss in oil 10 days at 25° C., percent ----- 0.9
Weight loss, carbon volatility 24 hours at 70° C.,
  percent --------------------------------------- 0.9
Heat stability:
  Pt–Co Color No. 50, min. ------------------ 10
  Pt–Co Color No. 500, min. ---------------- 30
  Black, min. ------------------------------- 150

*Example 8*

A mixture of 200 g. of meta-xylene, 300 ml. of benzene and 200 ml. of sodium dispersion, prepared by dispersing about 30% by weight of sodium in benzene, was charged under nitrogen to an autoclave, sealed and heated to 90° C. The gases were vented, and to the autoclave was charged a total of 800 g. of butadiene under 15 p.s.i.g. The temperature was maintained at about 90° C., and the pressure at 10 to 15 p.s.i.g., during addition of the butadiene. After all the butadiene had been added the reaction was continued for 30 min., and the reaction mixture was cooled to room temperature and quenched into excess water. The aqueous phase was discarded, and the oil phase was neutralized, washed, and stripped of solvent, the residue was a fluid copolymer oil having a viscosity at 25° C. of about 10 poises, and an iodine number of 345. The copolymer contained 20% meta-xylene.

Five hundred parts of the copolymer was dissolved in 1000 parts of benzene and epoxidized with 2400 parts of 16% peracetic acid containing 13 parts of sodium acetate. The epoxidation temperature was 70–75° C. After 2 hrs. of reaction, the organic phase was removed and worked up as in the previous examples. The solvent free product analyzed 8.99% oxirane oxygen and had a viscosity of 25° C. of 600 poises.

One hundred parts of poly(vinyl chloride) resin (Geon-101) was blended on a plastics mill with 1.5 parts of a Ba–Cd complex organic stabilizer and 70 parts of the epoxidized copolymer prepared above. Samples of the blend were tested as follows.

Modulus at 100% elongation at 25° C. and 50%
  R.H., p.s.i. ---------------------------------- 1890
Ultimate tensile strength at 25° C. and 50% R.H.,
  p.s.i. ---------------------------------------- 2485
Ultimate elongation at 25° C. and 50% R.H., per-
  cent ------------------------------------------ 290
Hardness, Shore durometer A at 25° C. and 50%
  R.H. ------------------------------------------ 89
Weight loss in water 10 days at 25° C., percent --- 1.6
Weight loss in oil 10 days at 25° C., percent ----- 0.8
Weight loss, carbon volatility 24 hours at 70° C.,
  percent --------------------------------------- 1.7
Heat stability:
  Pt–Co Color No. 50, min. ------------------ 10
  Pt–Co Color No. 500, min. ---------------- 35
  Black, min. ------------------------------- 180

*Example 9*

A mixture of 750 parts of benzene, 16 parts of sodium and 131 parts of a commercial mixed xylene containing 25% ortho-xylene, 46% meta-xylene, 20% para-xylene and 9% ethylbenzene was heated in an autoclave to 90° C. and to it was added a total of 326 parts of butadiene under 15 p.s.i.g. After the butadiene had been absorbed as revealed by a drop in pressure to about 3 p.s.i.g. the reaction mixture was quenched and neutralized, the oil phase was separated off, washed with water and stripped of solvent. The residue was a fluid copolymer oil having a viscosity at 25° C. of 1 poise and an iodine number of 320. The copolymer contained 30% mixed xylene.

Five hundred parts of the copolymer were dissolved in 1000 parts of benzene and epoxidized with 2400 parts of 16% peracetic acid containing 13 parts of sodium acetate. The epoxidation temperature was 70–75° C. After 2 hrs. of reaction, the organic phase was removed and worked up as in the previous examples. The solvent free product analyzed 9.01% oxirane oxygen and had a viscosity at 25° C. of 10 poises.

A poly(vinyl chloride) plastisol was prepared as follows: One hundred parts of poly(vinyl chloride) resin (Geon. 121) was blended with 60 parts of the epoxidized butadiene-xylene copolymer prepared above, 20 parts of butyl epoxy stearate and 2 parts of a Ba–Cd complex organic stabilizer until a uniform consistency was obtained. To this blend was added 12 parts of an anhydride-glycol adduct (formed by reacting 2 moles of maleic anhydride with 1 mole of diethylene glycol for 2.5 hrs. at 110° C. to an acid number of 414) in 2 parts of methanol. This mixture was placed in a vacuum deaerator at 4–6 mm. pressure thereby removing the methanol.

A Mylar film was stretched over the face of a steel plate and taped in place. The plastisol was then cast over the film using the doctor blade. The sample was placed into a forced air oven and cured for 10 min. at a temperature of 350° F. After the plate was taken out and cooled with water, the film and cured plastic were removed. The film was then stripped from the plastic. Another sample was prepared in a like manner but was cured for 20 minutes at 350° F. Specimens were cut from these sheets and tested as indicated in the following table:

| Cure, minutes | 10 | 20 |
|---|---|---|
| Modulus at 10% Elongation at 25° C. and 50% RH, p.s.i. | 5,870 | 9,920 |
| Ultimate Tensile Strength at 25° C. and 50% RH, p.s.i. | 967 | 1,374 |
| Ultimate Elongation at 25° C. and 50% RH, percent | 88 | 60 |
| Hardness, Shore durometer, D at 25° C. and 50% RH | 40 | 45 |

As will be apparent to those skilled in the art, numerous modifications and variations of the poly(vinyl chloride) compositions illustrated above may be made without departing from the spirit of the invention or the scope of the following claims.

I claim:

1. A resin composition which comprises 100 parts of a vinyl chloride polymer in which at least 50% of the polymer forming units are derived from vinyl chloride, and as plasticizer therefor, 1–100 parts by weight of an epoxidized copolymer of butadiene and xylene containing 10–50% by weight of xylene and at least 7% by weight of epoxy oxygen.

2. A resin composition which comprises 100 parts of a vinyl chloride polymer in which at least 50% of the polymer forming units are derived from vinyl chloride, and as a primary plasticizer therefor, 40–100 parts by weight of an epoxidized copolymer of butadiene and xylene containing 10–50% by weight of xylene and at least 7% by weight of epoxy oxygen.

3. The resin composition of claim 2 in which the vinyl chloride polymer is a homopolymer of vinyl chloride.

4. The resin composition of claim 2 in which the epoxidized copolymer contains 25–45% by weight of xylene and 8–10% by weight of epoxy oxygen.

5. A resin composition which comprises 100 parts of a vinyl chloride polymer in which at least 50% of the polymer forming units are derived from vinyl chloride, 40–100 parts by weight of a conventional primary plasticizer for vinyl chloride polymers, and as an auxiliary plasticizer and stabilizer therefor, 1–40 parts by weight of an epoxidized copolymer of butadiene and xylene containing 10–50% by weight of xylene and at least 7% by weight of epoxy oxygen.

6. The resin composition of claim 5 in which the vinyl chloride polymer is a homopolymer of vinyl chloride.

7. The resin composition of claim 5 in which the epoxidized copolymer contains 25–45% by weight of xylene and 8–10% by weight of epoxy oxygen.

8. A resin composition which comprises 100 parts of a vinyl chloride polymer in which at least 50% of the polymer forming units are derived from vinyl chloride, 0–40 parts by weight of a conventional primary plasticizer for vinyl chloride polymers, 10–80 parts by weight of an epoxidized copolymer of butadiene and xylene containing 10–50% by weight of xylene and at least 7% by weight of epoxy oxygen, and 1–25 parts by weight of a conventional polyfunctional active hydrogen curing agent for the epoxidized copolymer.

9. The resin composition of claim 8 in which the vinyl chloride polymer is a homopolymer of vinyl chloride.

10. The resin composition of claim 8 in which the epoxidized copolymer contains 25–45% by weight of xylene and 8–10% by weight of epoxy oxygen.

References Cited by the Examiner
UNITED STATES PATENTS
2,842,513   7/58   Fitz Gerald et al. _____ 260—30.4

ALEXANDER H. BRODMERKEL, *Primary Examiner.*
MORRIS LIEBMAN, *Examiner.*